US012412513B2

(12) United States Patent
Zeng et al.

(10) Patent No.: US 12,412,513 B2
(45) Date of Patent: Sep. 9, 2025

(54) DISPLAY PANEL AND ELECTRONIC APPARATUS INCLUDING FRAME BUFFER FOR PROVIDING DIFFERENT SETTINGS FOR DIFFERENT BIT PLANE DATA

(71) Applicant: WUHAN CHINA STAR OPTOELECTRONICS SEMICONDUCTOR DISPLAY TECHNOLOGY CO., LTD., Hubei (CN)

(72) Inventors: Mian Zeng, Hubei (CN); Liang Sun, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/565,535

(22) PCT Filed: Sep. 25, 2023

(86) PCT No.: PCT/CN2023/120983

§ 371 (c)(1),
(2) Date: Nov. 30, 2023

(87) PCT Pub. No.: WO2025/000718

PCT Pub. Date: Jan. 2, 2025

(65) Prior Publication Data

US 2025/0104606 A1 Mar. 27, 2025

(30) Foreign Application Priority Data

Jun. 30, 2023 (CN) ........................ 202310804392.6

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01);
(Continued)

(58) Field of Classification Search
CPC ............. G09G 3/32; G09G 2310/0267; G09G 2310/0275; G09G 2310/08; G09G 2320/0247; G09G 2360/18
See application file for complete search history.

(56) References Cited

U.S. PATENT DOCUMENTS 5,940,142 A * 8/1999 Wakitani ............. G09G 3/2033 345/694
7,277,069 B2 * 10/2007 Hoppenbrouwers ........................ G09G 3/2037 345/63

FOREIGN PATENT DOCUMENTS

CN 1155136 A 7/1997
CN 1499466 A 5/2004
(Continued)

OTHER PUBLICATIONS

International Search Report in International application No. PCT/CN2023/120983, mailed on Mar. 5, 2024.
(Continued)

*Primary Examiner* — Stephen G Sherman
(74) *Attorney, Agent, or Firm* — PV IP PC; Wei Te Chung

(57) ABSTRACT

The present disclosure provides a display panel and an electronic apparatus, including: a plurality of sub-pixels; a frame buffer module that caches a plurality of pieces of bit plane data of each sub-pixel corresponding to a frame to be displayed, wherein first bit plane data controls a corresponding sub-pixel continuously to emit light or not to emit light within the duration (n1×T), and n1 is related to a storage bit of the first bit plane data; and a source drive module that
(Continued)

reads each piece of the bit plane data at least once and reads at least one piece of the first bit plane data at least twice in the frame to be displayed.

16 Claims, 10 Drawing Sheets

(52) U.S. Cl.
CPC . *G09G 2310/08* (2013.01); *G09G 2320/0247* (2013.01); *G09G 2360/18* (2013.01)

(56) References Cited

FOREIGN PATENT DOCUMENTS

| | | | |
|---|---|---|---|
| CN | 107591119 | A | 1/2018 |
| CN | 110379363 | A | 10/2019 |
| KR | 20080047922 | A | 5/2008 |

OTHER PUBLICATIONS

Written Opinion of the International Search Authority in International application No. PCT/CN2023/120983, mailed on Mar. 5, 2024.

* cited by examiner

DISPLAY PANEL AND ELECTRONIC APPARATUS INCLUDING FRAME BUFFER FOR PROVIDING DIFFERENT SETTINGS FOR DIFFERENT BIT PLANE DATA

TECHNICAL FIELD

The present disclosure relates to a display technology field, and in particular, to manufacturing of a display module, and specifically, to a display panel and an electronic apparatus.

BACKGROUND

A micro light emitting diode display module (Micro LED) is a thin-film, miniaturized, and array-based LED structure design. The Micro LED may be used in micro-display fields such as virtual reality, augmented reality, projection, helmet-mounted display, and head-up display.

Currently, a digital subfield scanning method is commonly used for display driving of the Micro LED, that is, one frame may be divided into a plurality of subframes with different weights. Different weights indicate different light emitting durations corresponding to sub-pixels, thus corresponding light emission or non-light emission is performed based on a value of each subframe, and brightness of a gray-scale corresponding to the frame is presented by superimposing light emitting durations of the plurality of subframes. However, for a subframe with a larger weight, a sub-pixel does not emit light in one of this subframe and an adjacent subframe and emits light in the other of this subframe and the adjacent subframe, because the subframe with a larger weight lasts for a long duration, a brightness change of the sub-pixel is obvious when the sub-pixel switches between non-light emission and light emission states, causing flickering, which reduces quality of a display image.

Therefore, when the conventional digital subfield scanning method is used for display driving, a problem of screen flickering exists and needs to be improved urgently.

SUMMARY

An objective of the present disclosure is to provide a display panel and an electronic apparatus to resolve a technical problem of screen flickering that occurs when a conventional digital subfield scanning method is used for display driving.

The present disclosure provides a display panel, including:

- a plurality of sub-pixels;
- a frame buffer module configured to cache a plurality of pieces of bit plane data of each sub-pixel corresponding to a frame to be displayed, wherein the plurality of pieces of bit plane data include a plurality of pieces of first bit plane data, each piece of the first bit plane data is used for controlling a corresponding sub-pixel continuously to emit light or not to emit light within the duration (n1×T), n1 is an integer greater than one, a value of n1 corresponding to different first bit plane data is different, the value of n1 is related to a storage bit of the corresponding first bit plane data, and T is a reference duration; and
- a source drive module electrically connected between the frame buffer module and the plurality of sub-pixels, and configured to read each piece of the bit plane data at least once, and read at least one piece of the first bit plane data at least twice in the corresponding frame to be displayed, wherein each time the first bit plane data is read, the first bit plane data is used for controlling the corresponding sub-pixel continuously to emit light or not to emit light within the duration T.

BENEFICIAL EFFECTS

The present disclosure provides a display panel and an electronic apparatus, including: a plurality of sub-pixels; a frame buffer module configured to cache a plurality of pieces of bit plane data of each sub-pixel corresponding to a frame to be displayed, wherein the plurality of pieces of bit plane data include a plurality of pieces of first bit plane data, each piece of the first bit plane data is used for controlling a corresponding sub-pixel continuously to emit light or not to emit light within the duration (n1×T), n1 is an integer greater than one, a value of n1 corresponding to different first bit plane data is different, the value of n1 is related to a storage bit of the corresponding first bit plane data, and T is a reference duration; and a source drive module electrically connected between the frame buffer module and the plurality of sub-pixels. By configuring the source drive module to read each piece of the bit plane data at least once, and read at least one piece of the first bit plane data at least twice, wherein each time the first bit plane data is read, the first bit plane data is used for controlling the corresponding sub-pixel continuously to emit light or not to emit light within the duration T, a duration of light emission or non-light emission of the sub-pixel is shortened. This reduces a flickering risk of the sub-pixel when switching to a non-light emission state or a light emission state, which is different from the previous state, in the frame to be displayed.

BRIEF DESCRIPTION OF THE DRAWINGS

The present disclosure is further described below using the accompanying drawings. It should be noted that, the accompanying drawings in the following description are only used to illustrate some embodiments of the present disclosure. For a person skilled in the art, other accompanying drawings can be obtained based on these accompanying drawings without creative efforts.

DETAILED DESCRIPTION

The technical solutions of the embodiments of the present disclosure are clearly and completely described below with reference to the accompanying drawings of the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure.

In the description of the present disclosure, the terms "first", "second", and the like are used for descriptive purposes only and cannot be understood as indicating or implying relative importance or implicitly indicating a quantity of indicated technical features. Therefore, features defined with "first" and "second" may explicitly or implicitly include one or more of the described features. In addition, it should be noted that, the accompanying drawings only provide structures that are closely related to the present disclosure, and some details that are not closely related to the disclosure are omitted. The purpose is to simplify the accompanying drawings and make the disclosure points clear at a glance, rather than to represent that an actual apparatus is exactly same as the drawings. This is not a limitation of the actual apparatus.

Reference herein to "an embodiment" means that a particular feature, structure, or characteristic described in the embodiment can be included in at least one embodiment of the present disclosure. The phrase occurred at various locations in the specification does not necessarily refer to a same embodiment, or an independent or alternate embodiment exclusive of another embodiment. A person skilled in the art understands, both explicitly and implicitly, that an embodiment described herein may be combined with another embodiment.

The present disclosure provides a display panel. The display panel includes but is not limited to the following embodiments or combinations of the following embodiments.

Figure 1:
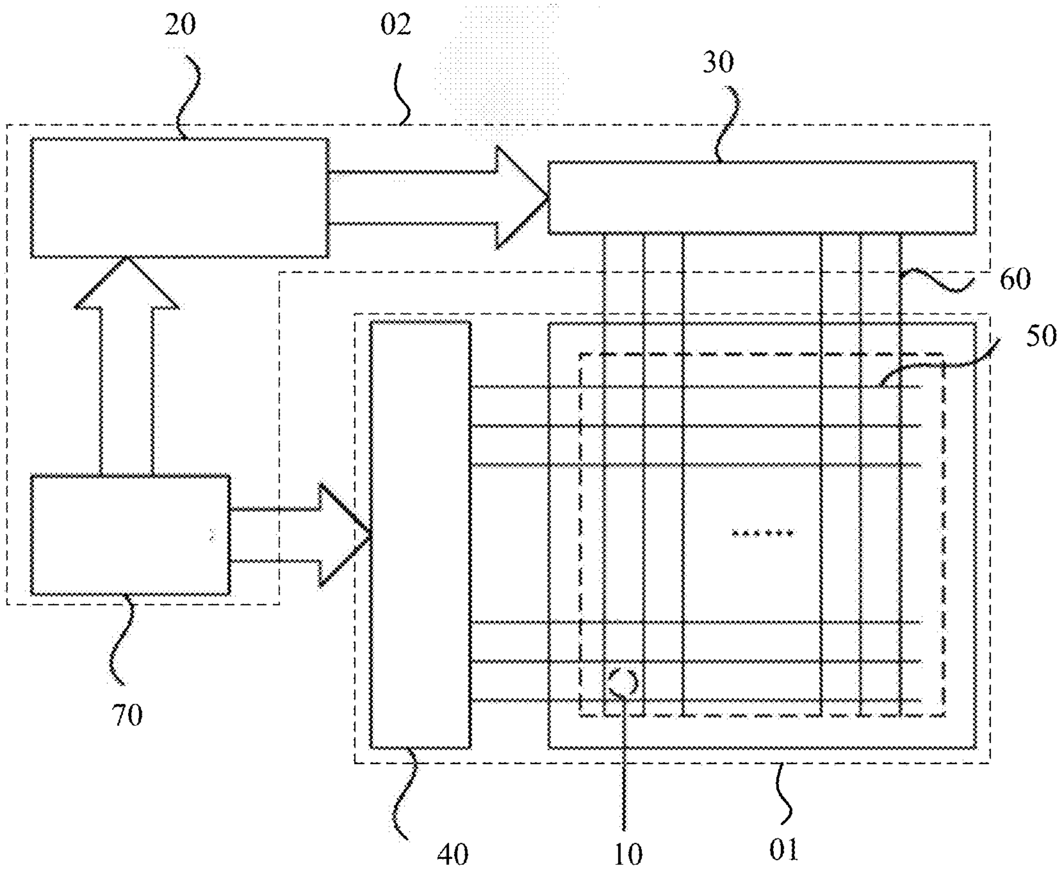
FIG. 1 is a schematic diagram of a top view of a display panel according to an embodiment of the present disclosure.
Figure 2:
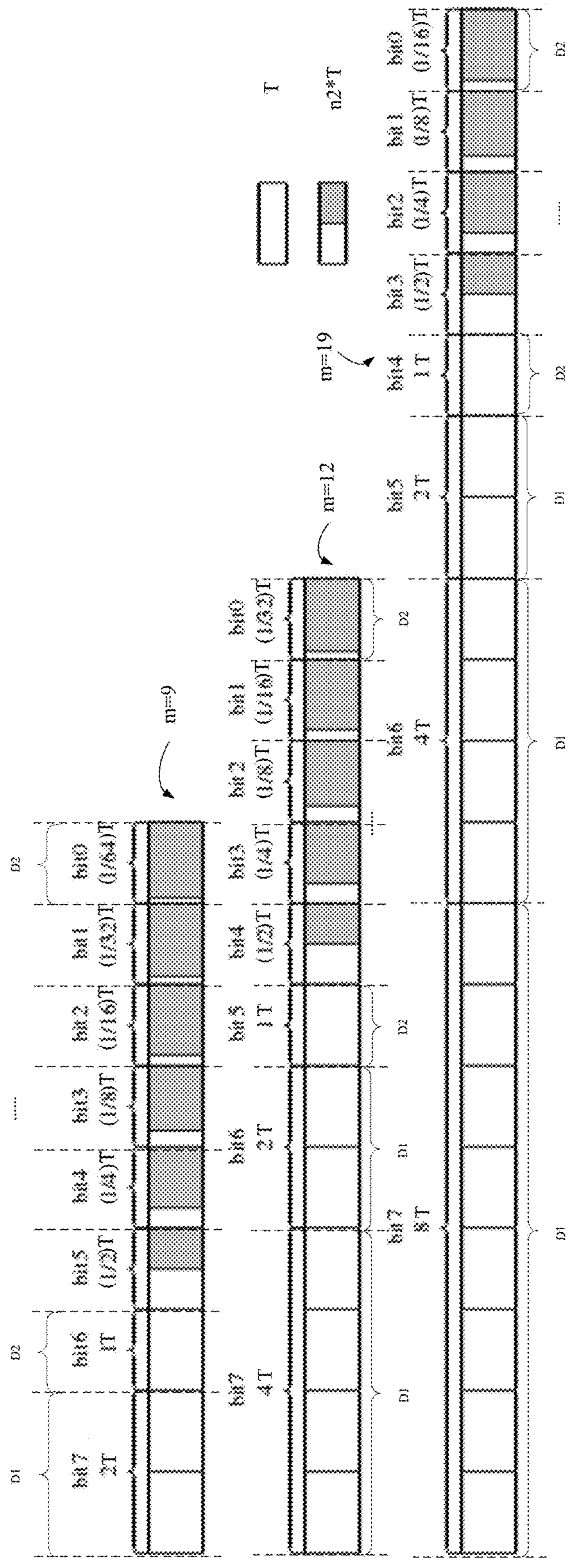
FIG. 2 shows arrangements of a plurality of pieces of bit plane data corresponding to different quantities of initial subframes according to an embodiment of the present disclosure.

In an embodiment, as shown in FIG. 1, a display panel 100 includes: a plurality of sub-pixels 10; a frame buffer module 20 configured to cache a plurality of pieces of bit plane data of each sub-pixel corresponding to a frame to be displayed, as shown in FIG. 2, wherein the plurality of pieces of bit plane data include a plurality of pieces of first bit plane data D1, each piece of the first bit plane data is used for controlling a corresponding sub-pixel continuously to emit light or not to emit light within a duration (n1×T), n1 is an integer greater than one, values of n1 are different corresponding to different first bit plane data, the value of n1 is related to a storage bit of the corresponding first bit plane data, and T is a reference duration; and a source drive module 30 electrically connected between the frame buffer module and the plurality of sub-pixels, wherein the source drive module 30 is configured to read each piece of the bit plane data at least once and to read at least one piece of the first bit plane data at least twice, in the corresponding frame to be displayed, and wherein each time the first bit plane data is read, the first bit plane data is used for controlling the corresponding sub-pixel continuously to emit light or not to emit light within the duration T.

For convenience of description, the plurality of sub-pixels are arranged along a row direction and a column direction as an example for description, but are not limited to this arrangement. Specifically, as shown in FIG. 1, the display panel may further include a gate drive module 40, a plurality of gate lines 50, and a plurality of data lines 60. Each gate line may be connected between a corresponding output port of the gate drive module and a corresponding row of sub-pixels, to transmit a corresponding gate signal to the row of sub-pixels. Each data line may be connected between the source drive circuit and a corresponding column of sub-pixels, to transmit a corresponding data signal to the column of sub-pixels.

As shown in FIG. 1, the display panel may include a panel body 01 and a drive chip 02 electrically connected to the panel body. The panel body may include the foregoing plurality of sub-pixels, the plurality of data lines, and the plurality of gate lines. The drive chip may include the foregoing frame buffer module and source drive module. Further, the drive chip may further include a timing control module 70 electrically connected to the frame buffer module and the gate drive module. The timing control module may be configured to obtain an image signal, and the image data may be processed by the timing control module or the frame buffer module to generate each piece of "a plurality of pieces of bit plane data" corresponding to each frame to be displayed. In the present embodiment, whether the gate drive module is included in the panel body or the drive chip is not limited. FIG. 1 only uses the gate drive module being included in the panel body as an example for description.

In the present embodiment, the plurality of pieces of bit plane data corresponding to the frame to be displayed may be understood as follows: in a conventional digital subfield scanning method, one frame to be displayed can be divided into a plurality of initial subframes (having one-to-one correspondence to the plurality of pieces of bit plane data) arranged in sequence, that is, a value of n1 in a duration "(n1×T)" in which the sub-pixel continuously emits light or does not emit light by the control of each piece of the bit plane data is related to a storage bit of the initial subframe. Weights corresponding to different storage bits are also different, and it may also be considered that the sub-pixel is controlled by the corresponding bit plane data with a corresponding weight in each initial subframe to emit light or not to emit light. For example, the frame to be displayed can be divided into eight initial subframes ("bit 0" to "bit 7") as shown in FIG. 2, that is, each frame to be displayed may be provided with eight pieces of bit plane data. A quantity of the bit plane data may be equal to a quantity of the initial subframes. Each piece of the bit plane data is stored in a corresponding storage bit. It can be considered that according to the eight pieces of bit plane data corresponding to "bit 0" to "bit 7", the corresponding eight storage bits increase in sequence. For example, a storage bit of "bit 0" is "bit 0" (the lowest bit), and a storage bit of "bit 7" is "bit 7" (the highest bit). A higher storage bit corresponds to a larger value of n1 (that is, a greater weight).

According to the foregoing description, each piece of first bit plane data is used for controlling the corresponding sub-pixel continuously to emit light or not to emitted in a duration (n1×T). n1 is an integer greater than one, and the value of n1 corresponding to different first bit plane data is different. When the frame to be displayed is divided into eight initial subframes ("bit 0" to "bit 7") as shown in FIG. 2, if the initial subframes corresponding to a reference duration T in the three frames are set to "bit 6", "bit 5", and "bit 4", weights corresponding to other initial subframes of the three frames are set differently, but all conforms to the weights increasing in sequence from "bit 0" to "bit 7".

It should be noted that, the examples in FIG. 2 of several setting modes for initial subframes corresponding to the reference duration T all lead to existence of an initial subframe with a weight less than 1. However, in the present embodiment, whether an initial subframe with a weight less than 1 and corresponding bit plane data (that is, different from the first bit plane data) exist is not limited. For example, if the initial subframe corresponding to the reference duration T is set to "bit 7", no initial subframe with a weight less than 1 and corresponding bit plane data exist.

Specifically, as shown in FIG. 2, when the initial subframe corresponding to the reference duration T is set to "bit 6", the weights of "bit 0" to "bit 7" may be (1/64), (1/32), (1/16), (1/8), (1/4), (1/2), 1, and 2 in sequence, wherein bit plane data corresponding to "bit 7" with a weight greater than one (that is, satisfying the value of n1) can be defined as the first bit plane data. Further, in the present embodiment, at least one piece of first bit plane data (which may only correspond to "bit 7") is read at least twice, and each time the first bit plane data is read, the first bit plane data is used for controlling the corresponding sub-pixel continuously to emit light or not to emit light within the duration T. That is, the same first bit plane data is read twice, and during each reading, only the reference duration T corresponding to a weight of one is used to limit a duration of light emission or non-light emission of the sub-pixel, which can prevent the sub-pixel from using an original large weight (greater than one, that is, the corresponding n1 is greater than one) of the first bit plane data to control the sub-pixel to emit light or not to emit light within a long time (that is, the corresponding n1×T). This reduces the duration of light emission or non-light emission of the sub-pixel, and reduces a flickering risk of the sub-pixel when switching to another non-light emission or light emission state in the frame to be displayed.

Similarly, as shown in FIG. 2, when the initial subframe corresponding to the reference duration T is set to "bit 5", the weights of "bit 0" to "bit 7" may be (1/32), (1/16), (1/8), (1/4), (1/2), 1, 2, and 4, wherein bit plane data corresponding to "bit 6" and "bit 7" with a weight greater than one (that is, satisfying the value of n1) can be defined as the first bit plane data. At this time, in the present embodiment, at least one piece of first bit plane data (here corresponding to at least one of "bit 6" or "bit 7") may be read at least twice. Similarly, as shown in FIG. 2, when the initial subframe corresponding to the reference duration T is set to "bit 4", the weights of "bit 0" to "bit 7" may be (1/16), (1/8), (1/4), (1/2), 1, 2, 4, and 8, wherein bit plane data corresponding to "bit 5" to "bit 7" with a weight greater than one (that is, satisfying the value of n1) can be defined as the first bit plane data. At this time, in the present embodiment, at least one piece of first bit plane data (here corresponding to at least one of "bit 5" to "bit 7") may be read at least twice.

According to the foregoing analysis, the frame to be displayed being divided into 8 initial subframes ("bit 0" to "bit 7") is used as an example. Compared with the conventional digital subfield scanning method, in the present embodiment, when the initial subframe corresponding to the reference duration T is set, for the first bit plane data with a weight greater than one, rather than scanning the sub-pixel only once to control, according to the weight, the sub-pixel to emit light or not to emit light at one time, a value of the weight (that is, n1) is used as a quantity of times to read the first bit plane data. To be specific, the gate drive module is configured to scan the same sub-pixel a plurality of times in the frame to be displayed, and a quantity of times the same sub-pixel is scanned is equal to a quantity of times the source drive module reads the plurality of pieces of bit plane data (greater than or equal to a sum of the weights corresponding to all first bit plane data, because it is also needed to consider that each piece of the bit plane data with a weight less than or equal to 1 also needs to be read once). Each time the gate drive module scans the sub-pixel, the source drive module is enabled to load the read bit plane data to the sub-pixel. The gate drive module is configured to scan the sub-pixel at least twice (equal to the weight of the corresponding first bit plane data, that is, the value of n1), to enable the source drive module to respectively load the same first bit plane data read in the two scans to the sub-pixel twice.

Further, as shown in FIG. 2, the plurality of pieces of bit plane data further include at least one piece of second bit plane data D2. Each piece of second bit plane data is used for controlling the corresponding sub-pixel continuously to emit light or not to emit light within a duration (n2×T). n2 is greater than 0 and less than or equal to 1. A value of n2 corresponding to different second bit plane data is different. The source drive module is configured to control the corresponding sub-pixel continuously to emit light or not to emit light within the duration (n2×T) each time the second bit plane data is read. According to the foregoing description, it can be considered that the plurality of pieces of bit plane data may also include at least one piece of second bit plane data D2 corresponding to at least one initial subframe with a weight less than 1, and each piece of second bit plane data is used for controlling the corresponding sub-pixel continuously to emit light or not to emit light within a duration shorter than the reference duration.

Specifically, according to the foregoing description, because each time the first bit plane data is read, the source drive module is only configured to control the corresponding sub-pixel continuously to emit light or not to emit light within the reference duration T, it can be considered that each piece of first bit plane data needs to be read n1 times, and brightness of n1 continuous light emissions or non-light emissions within the reference duration T caused by performing writing to the corresponding sub-pixel n1 times can be equal to brightness of one continuous light emission or non-light emission within the duration (n1×T) caused by performing writing once. The source drive module can control the corresponding sub-pixel continuously to emit light or not to emit light within the duration (n2×T) each time the second bit plane data is read, so that the second bit plane data only needs to be read once.

Following the foregoing description, if each time the source drive module reads the bit plane data and writes to the corresponding sub-pixel is defined as a target subframe, in the present embodiment, the frame to be displayed can be divided into a plurality of target subframes (a quantity of the target subframes is equal to a sum of a quantity of times the bit plane data is read by the source drive module, and is also equal to a sum of a quantity of the second bit plane data and the values of n1 of all first bit plane data) with equal periods (that is, equal to the reference duration T). For example, when the initial subframes corresponding to the reference duration T in FIG. 2 are set to "bit 6", "bit 5", and "bit 4" respectively, quantities m of target subframes corresponding to the three frames are 9, 12, and 19 respectively.

In an embodiment, as shown in FIG. 2, the plurality of pieces of first bit plane data in the bit plane data are arranged in sequence. In two adjacent pieces of first bit plane data, the value of n1 corresponding to one piece of the first bit plane data is h times the value of n1 corresponding to the other piece of the first bit plane data, and h is a positive integer greater than one. According to the foregoing description, each piece of the bit plane data is stored in a corresponding storage bit, and a higher storage bit corresponds to a larger value of n1 (that is, a greater weight). In the two pieces of first bit plane data arranged adjacently, the values of n1 of the two pieces of first bit plane data are different. That is, quantities of times the source drive module reads the two pieces of first bit plane data are different. To be specific, a quantity of times the source drive module reads the first bit plane data with a larger value of n1 (higher storage bit) may be h times a quantity of times reading the first bit plane data with a smaller value of n1 (lower storage bit).

Specifically, for example, when h is equal to two, it represents that between the two pieces of first bit plane data arranged adjacently, a weight of one of the two pieces of first bit plane data is twice a weight of the other of the two pieces of first bit plane data. For example, in the three target subframe division modes in FIG. 2, in "bit 0" to "bit 7", a weight of the latter one (that is, the value of n1) is twice a weight of the former one (that is, the value of n1). Certainly, the value of h is not limited in the present embodiment. For example, when h is equal to three, it represents that a weight of one piece of the first bit plane data is three times a weight of another piece of the first bit plane data. The total duration (n1×T) when the former is used for controlling the sub-pixel to emit light or not to emit light in the frame to be displayed is three times that of the latter. According to the foregoing description, two is a minimum value of h, which makes a difference between the durations in which the sub-pixel is controlled by two adjacent pieces of first bit plane data to emit light or not to emit light in a same frame to be displayed smaller, thereby increasing a weight difference between the two adjacent pieces of first bit plane data to improve accuracy of dividing the durations for controlling the sub-pixel to emit light or not to emit light in the corresponding initial subframes.

Figure 3:
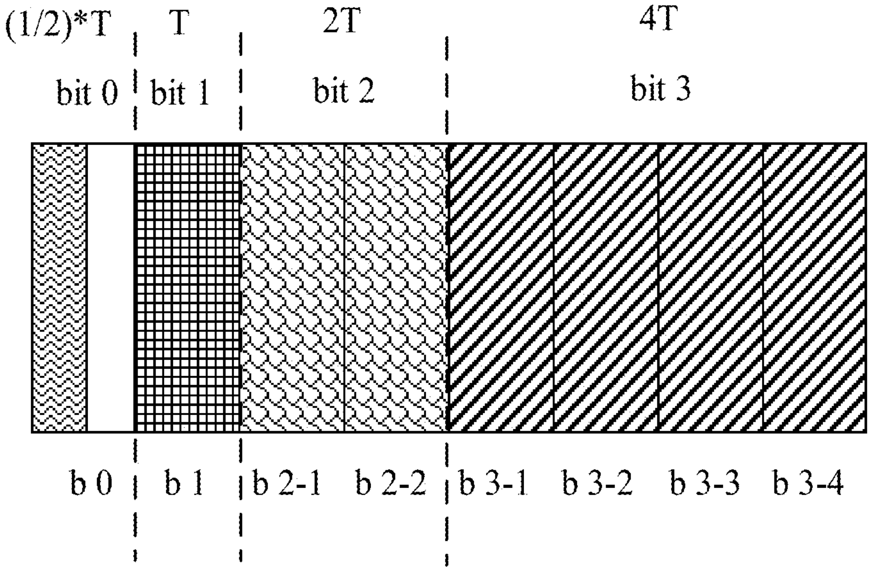
FIG. 3 shows an arrangement of a plurality of pieces of bit plane data corresponding to four initial subframes according to an embodiment of the present disclosure.
Figure 4:
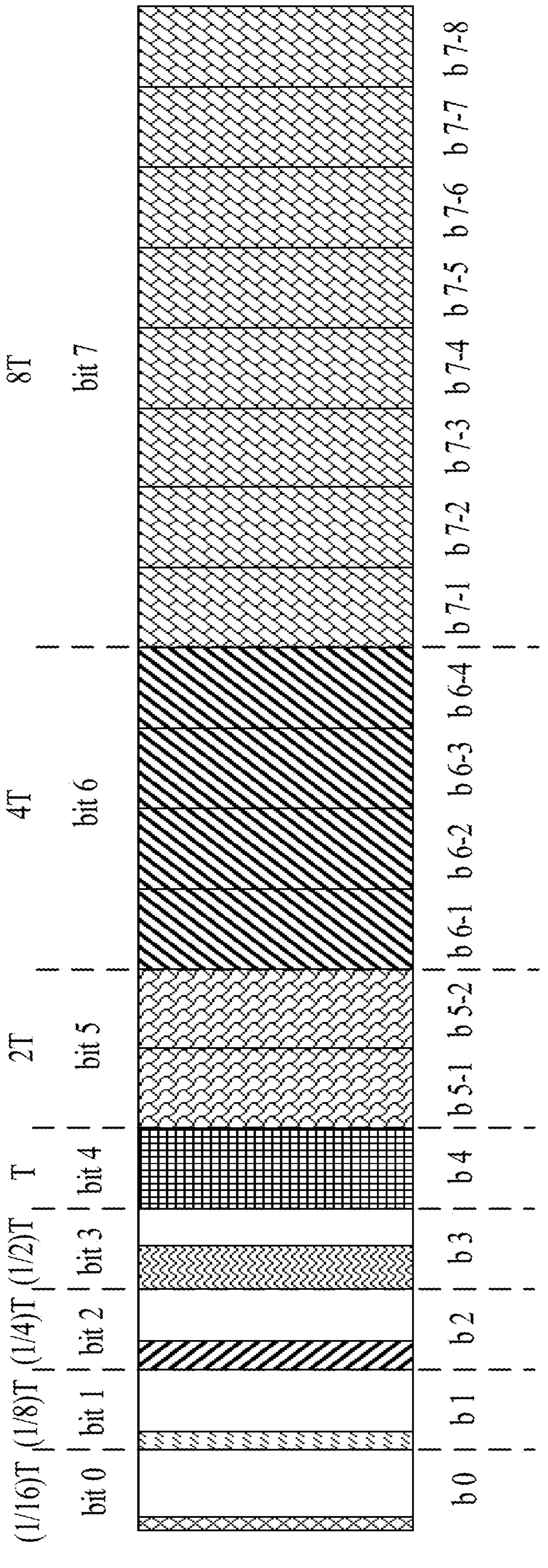
FIG. 4 shows an arrangement of a plurality of pieces of bit plane data corresponding to eight initial subframes according to an embodiment of the present disclosure.

For example, FIG. 3 shows a plurality of pieces of bit plane data corresponding to the frame to be displayed. Here a frame including 4 initial subframes ("bit 0" to "bit 3") is used as an example for description, wherein weights of "bit 0" to "bit 3" increase in sequence. Values of n2 corresponding to "bit 0" and "bit 1" are (½) and 1. Values of n1 corresponding to "bit 2" and "bit 3" are 2 and 4 in sequence. To be specific, durations in which a sub-pixel emits light or does not emit light in the plurality of initial subframes are equal to (½)×T, T, 2T, and 4T in sequence. Similarly, FIG. 4 shows a plurality of pieces of bit plane data corresponding to the frame to be displayed. Here a frame including 8 initial subframes ("bit 0" to "bit 7") is used as an example for description, wherein weights of "bit 0" to "bit 7" increase in sequence. Values of n2 corresponding to "bit 0" to "bit 4" are (1/16), (⅛), (¼), (½), and 1 in sequence. Values of n1 corresponding to "bit 5" to "bit 7" are 2, 4, and 8 in sequence. To be specific, durations in which a sub-pixel emits light or does not emit light in the plurality of initial subframes are equal to (1/16)×T, (⅛)×T, (¼)×T, (½)×T, T, 2T, 4T, and 8T in sequence.

In an embodiment, as shown in FIGS. 3 and 4, the plurality of pieces of first bit plane data include at least one piece of first type first bit plane data D11 (at least exemplified by at least two of "bit 3" in FIG. 3 and "bit 5" to "bit 7" in FIG. 4 as an example, for example, both are equal to a first value.) and at least one piece of second type first bit plane data D12 (at least exemplified by at least two of "bit 2" in FIG. 3 and "bit 5" to "bit 7" in FIG. 4 different from the first type first bit plane data, for example, both equal to a second value). One of each piece of first type first bit plane data and each piece of second type first bit plane data is used for controlling the corresponding sub-pixel continuously to emit light within the duration (n1×T), and the other of each piece of first type first bit plane data and each piece of second type first bit plane data is used for controlling the corresponding sub-pixel continuously not to emit light in the duration (n1×T). The source drive module is configured to read the second type first bit plane data at least once in a process of reading the same first type first bit plane data at least twice or in a process of reading at least two different ones of the at least one piece of first type first bit plane data at least twice respectively.

According to the foregoing description, each piece of the first bit plane data is used for controlling the corresponding sub-pixel continuously to emit light or not to emit light in the duration (n1×T). Here, the first bit plane data used for controlling the corresponding sub-pixel continuously to emit light or not to emit light in the duration (n1×T) is respectively defined as the first type first bit plane data (for example, equal to one of the first value and the second value) and the second type first bit plane data (for example, equal to the other of the first value and the second value).

Figure 5:
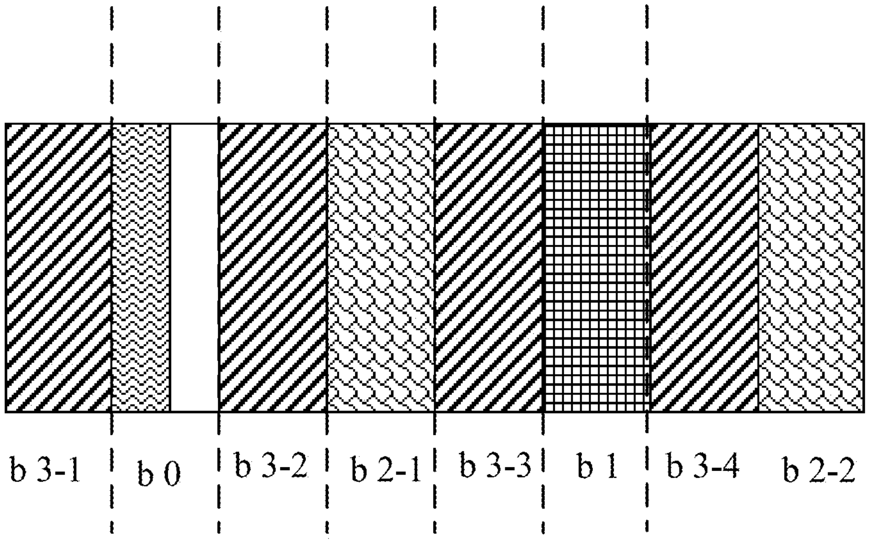
FIG. 5 shows a reading sequence of a plurality of pieces of bit plane data corresponding to eight target subframes obtained by division in FIG. 3 (whether the sequence is from left to right or from right to left is not limited).

Specifically, as shown in FIG. 3, here "bit 3" and "bit 2" respectively corresponding to the first type first bit plane data and the second type first bit plane data is used as an example. According to the foregoing description, it can be learned that the first type first bit plane data and the second type first bit plane data are respectively required to be read four times ("b 3-1" to "b 3-4" respectively) and twice ("b 2-1" and "b 2-2" respectively). Reading may be performed in a sequence as shown in FIG. 5 (from left to right). If the inclusion of the two pieces of second bit plane data corresponding to "bit 0" and "bit 1" are taken into consideration (whether the second bit plane data is used for controlling the corresponding sub-pixel to emit light or not to emit light is not limited), in a process of reading from "b 3-1" to "b 3-4" (the sequence is not limited), for example, in a process of reading in "b 3-2" and in a process of reading in "b 3-3", reading of the second type first bit plane data is inserted once (that is, "b 2-1").

Figure 6:
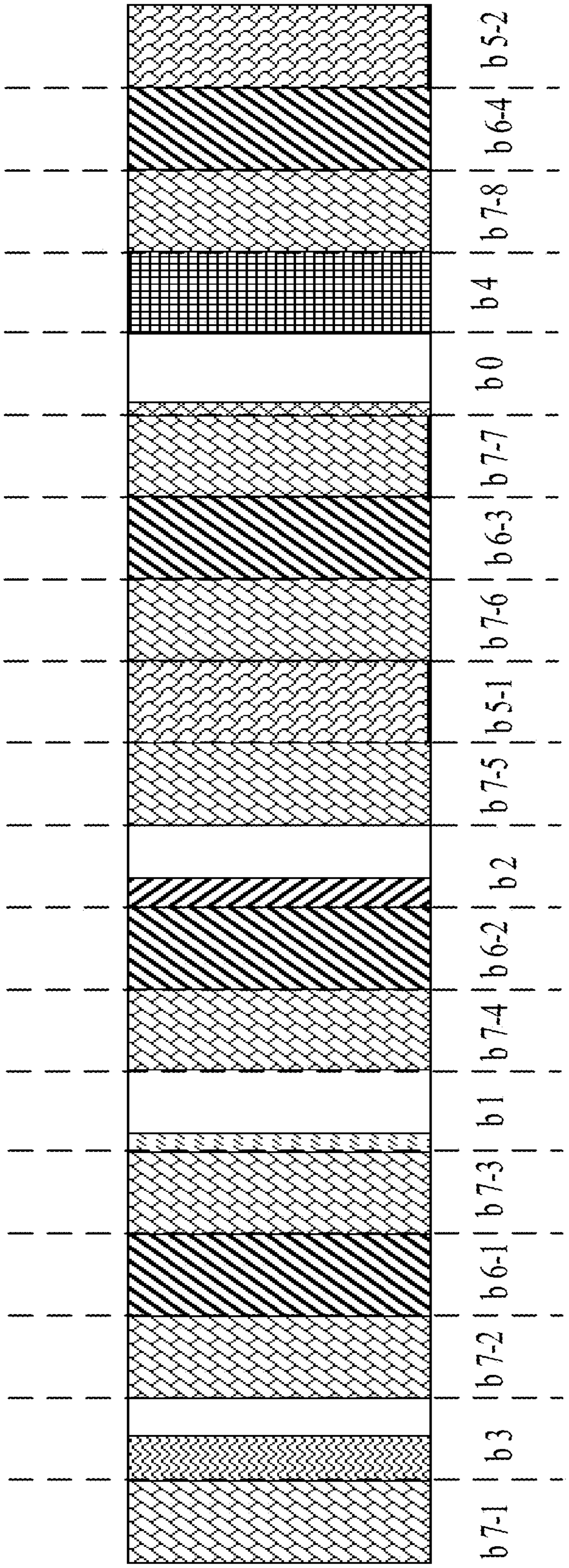
FIG. 6 shows a reading sequence of a plurality of pieces of bit plane data corresponding to 19 target subframes obtained by division in FIG. 4 (whether the sequence is from left to right or from right to left is not limited).

Similarly, as shown in FIG. 4, here "bit 7" and "bit 5" respectively corresponding to the first type first bit plane data and the second type first bit plane data is used as an example. According to the foregoing description, it can be learned that the first type first bit plane data and the second type first bit plane data are respectively required to be read eight times ("b 7-1" to "b 7-8" respectively) and twice ("b 5-1" and "b 5-2" respectively). Reading may be performed in a sequence as shown in FIG. 6 (from left to right). If the inclusion of the five pieces of second bit plane data corresponding to "bit 0" to "bit 4" are taken into consideration (whether the second bit plane data is used for controlling the corresponding sub-pixel to emit light or not to emit light is not limited), in a process of reading from "b 7-1" to "b 7-8" (the sequence is not limited), for example, in a process of reading in "b 7-5" and in a process of reading in "b 7-6", reading of the second type first bit plane data is inserted once (that is, "b 5-1").

Therefore, "in a process of . . . at least twice" in the present embodiment can be understood as: (1). Read the same or each of different pieces of first type bit plane data at least twice. (2). During an entire process of the at least two times of reading, insert reading of the second type first bit plane data once at least in any two adjacent times of reading.

It may be understood that, in the present embodiment, in a process of reading same first type first bit plane data a plurality of times, which is used for controlling the sub-pixel continuously to emit light or not to emit light within the corresponding reference duration T, or in a process of reading two different pieces of first type first bit plane data respectively, which are both used for controlling the sub-pixel continuously to emit light or not to emit light within the corresponding reference duration T, reading of the second type first bit plane data used for controlling the sub-pixel continuously not to emit light or to emit light within the corresponding reference duration T is inserted. This reduces the duration of light emission or non-light emission of the sub-pixel in the frame, and reduces a flickering risk of the sub-pixel when switching to another non-light emission or light emission state in the frame to be displayed.

Certainly, in the present embodiment, a specific reading sequence of the first type first bit plane data and the second type first bit plane data is not limited, provided that reading of the second type first bit plane data is inserted during the process of reading same or different first type first bit plane data a plurality of times.

Figure 7:
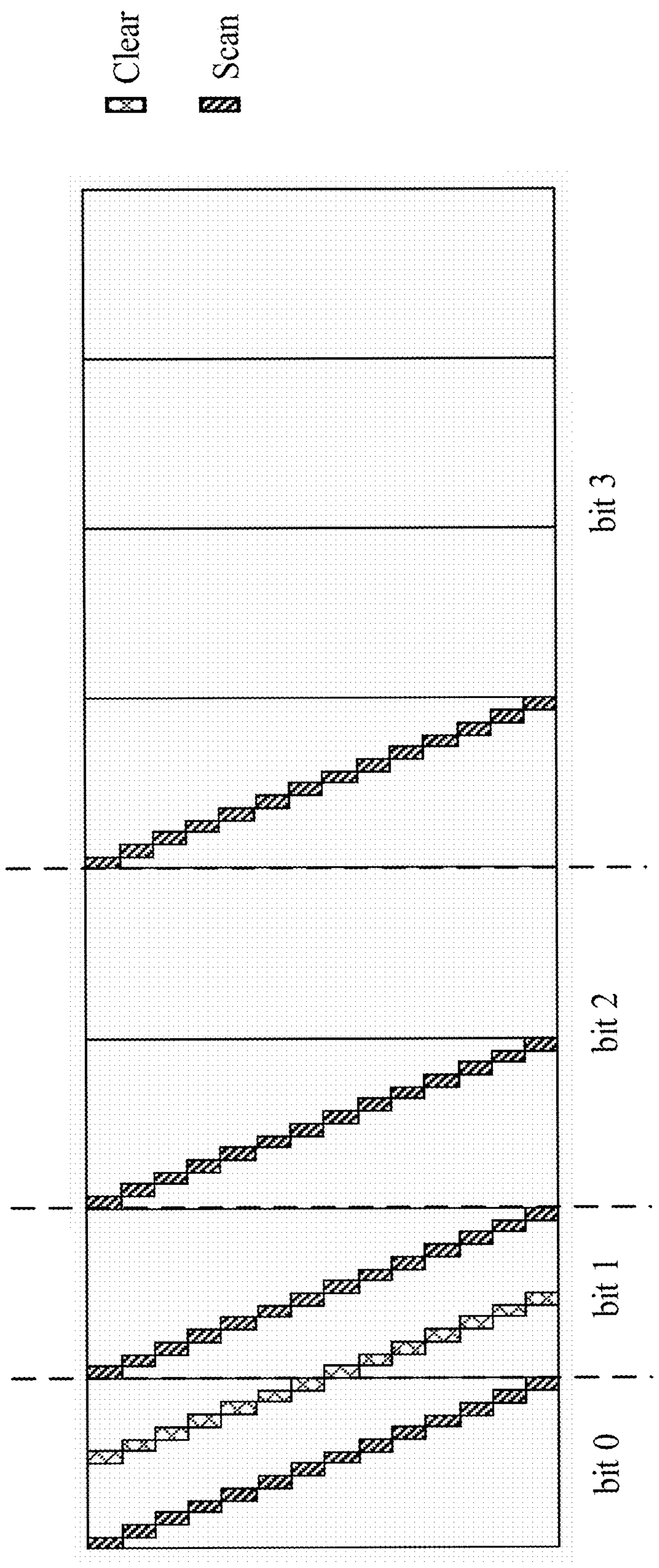
FIGS. 7 and 8 are schematic diagrams of timing of sub-scanning fields corresponding to FIGS. 5 and 6 respectively.
Figure 8:
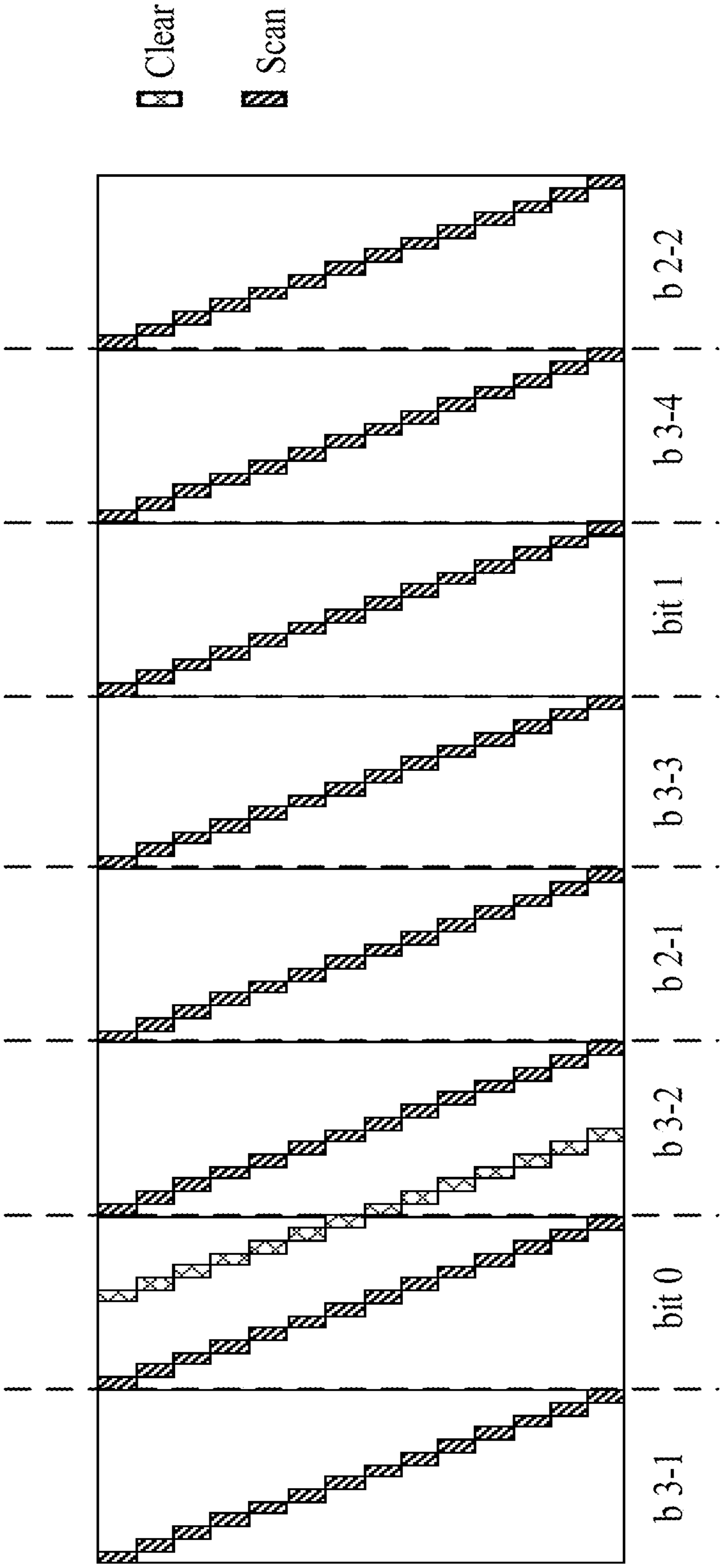
Figure 9:
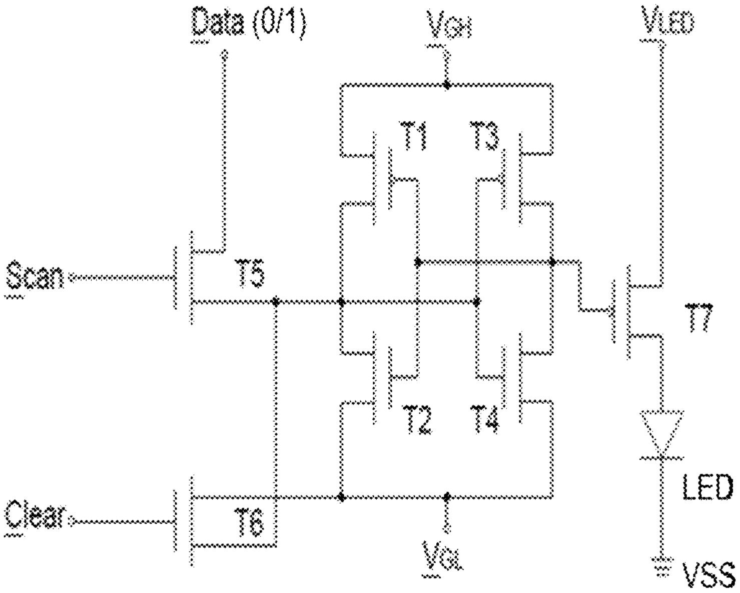
FIG. 9 is a diagram of a circuit for controlling a sub-pixel to emit or not to emit light according to an embodiment of the present disclosure.

Specifically, FIGS. 3 and 5 are used as examples for description. FIGS. 7 and 8 are schematic diagrams of timing of sub-scanning fields corresponding to FIGS. 5 and 6 respectively. Refer to a diagram of a circuit shown in FIG. 9 for description (transistors T1 to T4 constitute a storage module, gates of transistors T5 and T6 are respectively loaded with a scan signal Scan and a clear signal Clear, input terminals of the transistors T5 and T6 are respectively loaded with a data signal Data (used for controlling the sub-pixel to emit light) and a low-voltage signal VGL (used for controlling the sub-pixel not to emit light), output terminals of the transistors T5 and T6 are both connected to the gates of the transistors T5 and T6, and a gate of a transistor T7 is connected to gates of the transistors T1 and T2). “Scan” and “Clear” in FIGS. 7 and 8 respectively represent a scanning valid pulse of the scan signal and a clear valid pulse of the clear signal. “Scan” and “Clear” are respectively used for controlling the sub-pixel to emit light or not to emit light in a corresponding duration (the initial subframe or the target subframe).

For example, as shown in FIGS. 3 and 7, in each initial subframe (“bit 0” to “bit 3”), a plurality of scanning valid pulses are generated sequentially to scan a plurality of rows of sub-pixels in sequence. According to the foregoing description, a light emitting duration based on “bit 1” is the reference duration T, and light emitting durations of the sub-pixels in the two initial subframes “bit 2” and “bit 3” are equal to 2T and 4T in sequence. For example, in “bit 1”, a plurality of “Scan” control the plurality of rows of sub-pixels to be scanned in sequence, and each row of sub-pixels is maintained at T after scanning. That is, in “bit 2”, the plurality of “Scan” again control the plurality of rows of sub-pixels to be scanned in sequence. A sub-pixel scanned first in “bit 1” is also scanned first in “bit 2”, otherwise a sub-pixel scanned later in “bit 1” is also scanned later in “bit 2”, to ensure that each sub-pixel is maintained at the same duration (that is, the light emitting duration) after being scanned in the same initial subframe. The light emitting duration of the sub-pixel in the initial subframe “bit 0” is equal to (½)×T, so it is needed to load the plurality of corresponding “Clear” to continue to act on the plurality of rows of sub-pixels within the duration (½)×T (that is, a non-light emitting duration) after the plurality of “Scan”, so as to turn off the plurality of rows of sub-pixels, to control the plurality of rows of sub-pixels not to emit light within a second (½)×T of “bit 0”.

It should be noted that, as shown in FIG. 7, because “bit 3” with a larger weight lasts for a longer duration, if the light emission state of the sub-pixel changes when the sub-pixel switches between the initial subframe “bit 3” and another adjacent initial subframe, according to the foregoing description, a flickering problem exists, resulting in poor display quality.

Differently, in the present embodiment, as shown in FIGS. 5 and 8, because the initial subframe is divided into a plurality of target subframes, in each subframe (each of “bit 0”, “bit 1”, and “b 2-1” to “b 2-2” and each of “b 3-1” to “bit 3-4”), the plurality of rows of sub-pixels are scanned according to the scan signal, and thus the plurality of sub-pixels are scanned (equivalent to instead of performing scanning merely once to present a corresponding initial subframe, now performing scanning according to the plurality of target subframes divided in each initial subframe respectively). The light emitting duration based on “bit 1” is the reference duration T. The light emitting duration of the sub-pixel corresponding to each of “bit 2-1” to “bit 2-2” and each of “b 3-1” to “b 3-4” is also equal to T. For example, when the plurality of target subframes are arranged in the sequence shown in FIG. 5, in “bit 1”, the plurality of “Scan” control the plurality of rows of sub-pixels to be scanned in sequence, and each row of sub-pixels is maintained at T after scanning. That is, in scanning of “b 3-4” after “bit 1”, the plurality of “Scan” again control the plurality of rows of sub-pixels to be scanned in sequence. A sub-pixel scanned first in “bit 1” is also scanned first in “bit 3-4”, otherwise a sub-pixel scanned later in “bit 1” is also scanned later in “bit 3-4”, to ensure that each sub-pixel is maintained at the same duration (that is, the light emitting duration) after being scanned in the same subframe. The light emitting duration of the sub-pixel in the initial subframe “bit 0” is equal to (½)×T, so the plurality of corresponding “Clear” are needed to continue to act on the plurality of rows of sub-pixels within the duration (½)×T after the “Scan”, so as to turn off the plurality of rows of sub-pixels, to control the plurality of rows of sub-pixels not to emit light within a second (½)×T of “bit 0”.

It may be understood that, as shown in FIG. 8, in the present disclosure, it may be considered that a weight of each divided target subframe is the same, that is, a duration of action on the sub-pixel is the same. When the sub-pixel switches between every two adjacent target subframes, according to the foregoing description, because reading all same or different first type first bit plane data at one time in sequence (for example, the one-time continuous reading of “b 3-1” to “b 3-4” is interrupted by at least reading the second type first bit plane data corresponding to “bit 1”) is avoided, at least the flickering phenomenon in FIGS. 3 and 7 can be improved.

In conclusion, in a process of reading a same one of the first type first bit plane data at least twice (both equal to the first value, such as “bit 3” in FIG. 3 or one of “bit 5” to “bit 7” in FIG. 4) or in a process of reading at least two different ones of the at least one piece of first type first bit plane data at least twice respectively (both equal to the second value, such as two of “bit 5” to “bit 7” in FIG. 4), the source drive module in the present embodiment reads the second type first bit plane data at least once (for example, one of “bit 2” in FIG. 3, or “bit 5” to “bit 7” in FIG. 4 different from the first type first bit plane data). This can avoid continuously reading a same one of the first type first bit plane data at least twice or reading different ones of the piece of first bit plane data at least twice in sequence, thereby avoiding causing the sub-pixel to emit light or not to emit light in the frame to be displayed for at least (2×T). Instead, reading of the second type first bit plane data is inserted in the process, to interrupt controlling of the continuous light-emitting or non-light-emitting of the sub-pixel. This reduces the duration of light emission or non-light emission of the sub-pixel in the frame to be displayed, and reduces a flickering risk of the sub-pixel when switching to another non-light emission or light emission state in the frame to be displayed.

In an embodiment, as shown in FIGS. 3 to 6, when the source drive module is configured to read the second type first bit plane data at least once in the process of reading the same first type first bit plane data at least twice, the value of n1 corresponding to the first type first bit plane data is greater than the value of n1 corresponding to the second type first bit plane data. It may be understood that, in the present embodiment, the value of n1 corresponding to reading of the second type first bit plane data to be inserted is further limited, and should be smaller relative to the value of n1 corresponding to the inserted reading of the second type first bit plane data, to avoid the corresponding first type first bit plane data with a larger weight being read continuously at one time. This can improve the foregoing most serious flickering problem.

For example, comparing FIGS. 3 and 5, in the process of reading of "b 3-1" to "b 3-4" corresponding to "bit 3" with a larger weight (the sequence is not limited), reading of "b 2-1" in "bit 2" with a smaller weight is inserted. For another example, comparing FIGS. 4 and 6, in the process of reading of "b 7-1" to "b 7-8" corresponding to "bit 7" with a larger weight (the sequence is not limited), reading of "b 5-1" in "bit 5" with a smaller weight is inserted.

In an embodiment, as shown in FIGS. 3 to 6, the source drive module is further configured to read the first type first bit plane data at least once between the step of reading the second type first bit plane data and the step of reading the same second type first bit plane data again, or between the step of reading one of two different pieces of second type first bit plane data and the step of reading the other of the two different pieces of second type first bit plane data. It may be understood that, in the present embodiment, reading of the first type first bit plane data at least once is also inserted to avoid reading the same or different second type first bit plane data at one time. Similarly, the foregoing flicker problem caused by continuously reading all the same or different second type first bit plane data at one time is also considered, and the flickering problem is further improved.

In an embodiment, similarly, "the plurality of pieces of first bit plane data include at least one piece of first type first bit plane data", and at least one piece of second bit plane data further includes at least one piece of first type second bit plane data, one of the first type first bit plane data and the first type second bit plane data is used for controlling the corresponding sub-pixel continuously to emit light within the duration (n1×T) or the duration (n2×T), and the other of the first type first bit plane data and the first type second bit plane data is used for controlling the corresponding sub-pixel continuously not to emit light within the duration (n1×T) or the duration (n2×T). The source drive module is configured to read the first type second bit plane data at least once between the step of reading the first type first bit plane data and the step of reading the same first type first bit plane data again, or between the step of reading one of two different pieces of first type first bit plane data and the step of reading the other of the two different pieces of first type first bit plane data.

That "at least one piece of the second bit plane data further includes at least one piece of first type second bit plane data, one of the first type first bit plane data and the first type second bit plane data is used for controlling the corresponding sub-pixel continuously to emit light within the duration (n1×T) or the duration (n2×T), and the other of the first type first bit plane data and the first type second bit plane data is used for controlling the corresponding sub-pixel continuously not to emit light within the duration (n1×T) or the duration (n2×T)" may be understood as: (1). One of the first type first bit plane data and the first type second bit plane data is used for controlling the corresponding sub-pixel to emit light, and the other of the first type first bit plane data and the first type second bit plane data is used for controlling the corresponding sub-pixel not to emit light. (2). The first type first bit plane data and the first type second bit plane data act on the corresponding sub-pixel for different durations, which are (n1×T) and (n2×T) respectively.

For example, the first type first bit plane data is used for controlling the corresponding sub-pixel to emit light in the duration (n1×T), and the first type second bit plane data is used for controlling the corresponding sub-pixel not to emit light in the duration (n2×T). For another example, the first type first bit plane data is used for controlling the corresponding sub-pixel not to emit light in the duration (n1×T), and the first type second bit plane data is used for controlling the corresponding sub-pixel to emit light in the duration (n2×T).

Similarly, in the present embodiment, in a process of reading same or different first type first bit plane data a plurality of times, which is used for controlling the sub-pixel continuously to emit light or not to emit light within the corresponding reference duration T, reading of the first type second bit plane data used for controlling the sub-pixel continuously not to emit light or to emit light within a corresponding duration (equal to (n2×T), less than the reference duration T) is inserted. This also reduces the duration of light emission or non-light emission of the sub-pixel in the frame, and reduces a flickering risk of the sub-pixel when switching to another non-light emission or light emission state in the frame to be displayed.

For example, comparing FIGS. 3 and 5, in the process of reading of "b 3-1" to "b 3-4" corresponding to the first type first bit plane data (the sequence is not limited), reading of the first type second bit plane data once (that is, "b 0") is inserted between "b 3-1" and "b 3-2". For another example, comparing FIGS. 4 and 6, in the process of reading of "b 7-1" to "b 7-8" corresponding to the first type first bit plane data (the sequence is not limited), reading of the first type second bit plane data once (that is, "b 3") is inserted between "b 7-1" and "b 7-2".

In an embodiment, based on the foregoing first type first bit plane data, second type first bit plane data, and first type second bit plane data, differently, the first type second bit plane data and the second type first bit plane data are respectively used for controlling the corresponding sub-pixel continuously to emit light or not to emit light within the duration (n2×T) and the duration (n1×T) (that is, both the first type second bit plane data and the second type first bit plane data are used for controlling the sub-pixel to emit light or not to emit light). The source drive module is configured to read the second type first bit plane data at least once in processes of reading the first type second bit plane data and the first type first bit plane data respectively.

That "the first type second bit plane data and the second type first bit plane data are respectively used for controlling the corresponding sub-pixel continuously to emit light or not to emit light within the duration (n2×T) and the duration (n1×T)" may be understood as: (1). Both the first type second bit plane data and the second type first bit plane data are used for controlling the corresponding sub-pixel to emit light or not to emit light. (2). The first type second bit plane data and the second type first bit plane data act on the corresponding sub-pixel for different durations, which are (n2×T) and (n1×T) respectively.

For example, the second type first bit plane data is used for controlling the corresponding sub-pixel to emit light in the duration (n1×T), and the first type second bit plane data is used for controlling the corresponding sub-pixel to emit light in the duration (n2×T). For another example, the second type first bit plane data is used for controlling the corresponding sub-pixel not to emit light in the duration (n1×T), and the first type second bit plane data is used for controlling the corresponding sub-pixel not to emit light in the duration (n2×T).

It may be understood that, in the present embodiment, in processes of reading the first type second bit plane data and the first type first bit plane data, which are both used for controlling the sub-pixel to emit light or not to emit light, reading the second type first bit plane data used for controlling the sub-pixel not to emit light or to emit light is inserted. This may also reduce the duration of light emission or non-light emission of the sub-pixel in the frame, and reduces a flickering risk of the sub-pixel when switching to another non-light emission or light emission state in the frame to be displayed.

For example, comparing FIGS. 3 and 5, the source drive module may read the second type first bit plane data at least once (for example, "b 3-2" in "bit 3") in processes of reading the first type second bit plane data (for example, "bit 0") and the first type first bit plane data (for example, "b 2-1" in "bit 2"). For another example, comparing FIGS. 4 and 6, the source drive module may read the second type first bit plane data at least once (for example, "b 7-2" in "bit 7") in processes of reading the first type second bit plane data (for example, "bit 3") and the first type first bit plane data (for example, "b 6-1" in "bit 6").

Figure 10:
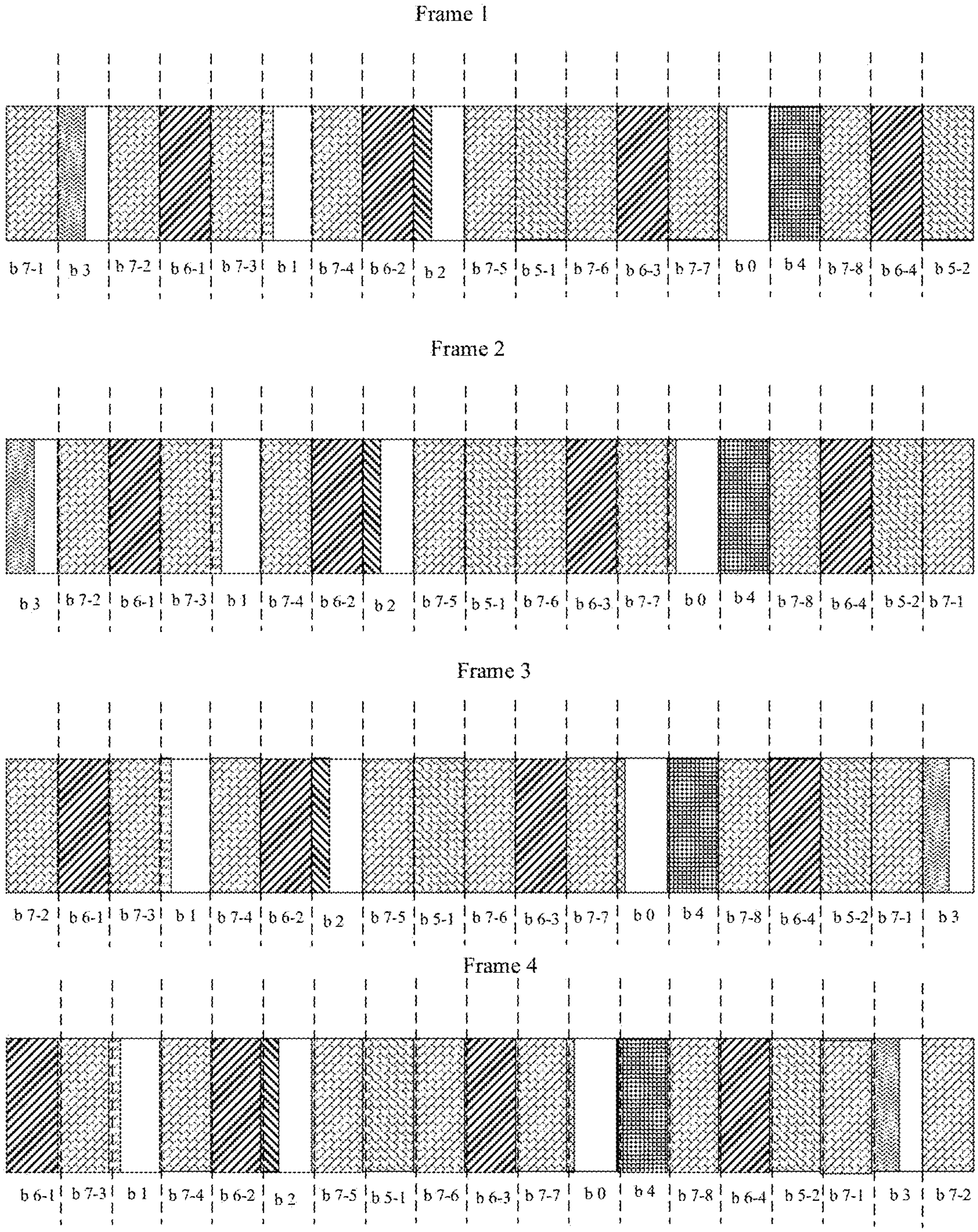
FIG. 10 shows a plurality of target display data corresponding to a plurality of consecutively arranged frames according to an embodiment of the present disclosure.

In an embodiment, the display panel has a plurality of frames to be displayed. In two different frames to be displayed, the source drive module respectively reads the plurality of pieces of first bit plane data of the two frames in different sequences. Specifically, Various reading sequences as shown in FIG. 10 may be provided for the plurality of pieces of bit plane data shown in FIG. 4. For a still picture (which can be considered as that a plurality of frames (Frame 1 to Frame 4) of same initial display data are set continuously), in the present embodiment, a plurality of pieces of first bit plane data in the same "a plurality of pieces of bit plane data" are read in different sequences in different frames. In this way, even if one of the frames still has a weak flickering phenomenon, because in the plurality of frames corresponding to the still picture, switching conditions of the sub-pixels between light emission and non-light emission in each frame are different (that is, a sequence of arrangement of the plurality of target subframes is different), a switching rule of the sub-pixels between light emission and non-light emission in the plurality of frames can be scrambled to extend a differentiation period of a multi-frame image, thus reducing a flickering risk.

The present disclosure further provides an electronic apparatus, including the display panel as described in any one of the above.

The display panel and electronic apparatus provided by embodiments of the present disclosure are introduced in detail above. Specific examples are used in the present disclosure to illustrate the principles and implementations of the present disclosure. The description of the foregoing embodiments is only used to help understand the technical solutions and core ideas of the present disclosure. A person of ordinary skill in the art may understand that, modifications may still be made to the technical solutions described in the foregoing embodiments, or equivalent replacements may be made to the part of the technical features, and such modifications or replacements do not cause the essence of corresponding technical solutions to depart from the scope of the technical solutions in the embodiments of this application.

What is claimed is:

1. A display panel, comprising:

a plurality of sub-pixels;

a frame buffer configured to cache a plurality of pieces of bit plane data of each of the sub-pixels corresponding to a frame to be displayed, wherein the plurality of pieces of bit plane data comprise a plurality of pieces of first bit plane data, each of the plurality of pieces of the first bit plane data is used for controlling a corresponding sub-pixel continuously to emit light or not to emit light within a duration (n1×T), n1 is an integer greater than one, different values of n1 correspond to different ones of the plurality of pieces of first bit plane data, the value of n1 is related to a storage bit of the corresponding first bit plane data, and T is a reference duration; and a source driver electrically connected between the frame buffer and the plurality of sub-pixels, and wherein the source driver is configured to read each piece of the bit plane data at least once and to read at least one piece of the first bit plane data at least twice in the corresponding frame to be displayed, wherein each time the first bit plane data is read, the first bit plane data is used for controlling the corresponding sub-pixel continuously to emit light or not to emit light within a duration T;

wherein the plurality of pieces of first bit plane data comprise at least one piece of first type first bit plane data and at least one piece of second type first bit plane data, one of each of the at least one piece of first type first bit plane data and each of the at least one piece of second type first bit plane data is used for controlling the corresponding sub-pixel continuously to emit light within the duration (n1×T), and the other of each of the at least one piece of first type first bit plane data and each of the at least one piece of second type first bit plane data is used for controlling the corresponding sub-pixel continuously not to emit light in the duration (n1×T);

wherein the source driver is configured to read the second type first bit plane data at least once between reading of one of the at least one piece of first type first bit plane data and reading of the one of the at least one piece of first type first bit plane data at least the second time, or between reading of one of at least two different ones of the at least one piece of first type first bit plane data and reading of other of the at least two different ones of the at least one piece of first type first bit plane data at least the second time;

wherein the plurality of pieces of bit plane data further comprise at least one piece of second bit plane data, each of the at least one piece of second bit plane data is used for controlling the corresponding sub-pixel continuously to emit light or not to emit light within a corresponding duration (n2×T), n2 is greater than 0 and less than or equal to 1, and different values of n2 correspond to different ones of the at least one piece of second bit plane data;

wherein the source driver is configured to control the corresponding sub-pixel continuously to emit light or not to emit light within the duration (n2×T) each time the second bit plane data is read;

wherein the plurality of pieces of first bit plane data comprise at least one piece of first type first bit plane data, at least one piece of second bit plane data comprises at least one piece of first type second bit plane data, one of the first type first bit plane data and the first type second bit plane data is used for controlling the corresponding sub-pixel continuously to emit light within the duration (n1×T) or the duration (n2×T), and the other of the first type first bit plane data and the first type second bit plane data is used for controlling the corresponding sub-pixel continuously not to emit light within the duration (n1×T) or the duration (n2×T); and wherein the source driver is configured to read the first type second bit plane data at least once between reading of one of the at least one piece of first type first bit plane data and reading of the one of the at least one piece of first type first bit plane data the second time, or between reading of one of two different ones of the at least one piece of first type first bit plane data and reading of other of the two different ones of the at least one piece of first type first bit plane data.

2. The display panel as claimed in claim 1, wherein the source driver is configured to read the second type first bit plane data at least once between at least two readings of same first type first bit plane data, wherein the value of n1 corresponding to the first type first bit plane data is greater than the value of n1 corresponding to the second type first bit plane data; or the source driver is configured to read the second type first bit plane data at least once between at least two readings of at least two different pieces of first type first bit plane data respectively, wherein the value of n1 corresponding to each of the at least two pieces of first type first bit plane data is greater than the value of n1 corresponding to the second type first bit plane data.

3. The display panel as claimed in claim 1, wherein the source driver is further configured to read the first type first bit plane data at least once between two readings of a same one of the second type first bit plane data or between two readings of two different ones of the at least one piece of second type first bit plane data respectively.

4. The display panel as claimed in claim 1, wherein the plurality of pieces of bit plane data further comprise at least one piece of second bit plane data, each of the at least one piece of second bit plane data is used for controlling the corresponding sub-pixel continuously to emit light or not to emit light within the duration (n2×T), n2 is greater than 0 and less than or equal to 1, and the different values of n2 correspond to different ones of the at least one piece of second bit plane data;

wherein the source driver is configured to control the corresponding sub-pixel continuously to emit light or not to emit light within the duration (n2×T) each time the second bit plane data is read;

wherein the plurality of pieces of first bit plane data comprise at least one piece of first type first bit plane data and at least one piece of second type first bit plane data, one of each of the at least one piece of first type first bit plane data and each of the at least one piece of second type first bit plane data is used for controlling the corresponding sub-pixel continuously to emit light within the duration (n1×T), and the other of each of the at least one piece of first type first bit plane data and each of the at least one piece of second type first bit plane data is used for controlling the corresponding sub-pixel continuously not to emit light in the duration (n1×T);

wherein at least one piece of the second bit plane data comprises at least one piece of first type second bit plane data, and the first type second bit plane data and the second type first bit plane data are respectively used for controlling the corresponding sub-pixel continuously to emit light or not to emit light within the duration (n2×T) and the duration (n1×T); and wherein the source driver is configured to read the second type first bit plane data at least once between reading of the first type second bit plane data and reading of the first type first bit plane data respectively.

5. The display panel as claimed in claim 1, wherein the plurality of pieces of first bit plane data in the bit plane data are arranged in sequence, in two adjacent ones of the pieces of first bit plane data, the value of n1 corresponding to one of the two adjacent pieces of first bit plane data is h times the value of n1 corresponding to the other of the two adjacent pieces of first bit plane data, and h is a positive integer greater than one.

6. The display panel as claimed in claim 1, wherein the display panel has a plurality of frames to be displayed, and in two different ones of the plurality of frames to be displayed, the source driver respectively reads the plurality of pieces of first bit plane data of the two different frames to be displayed in different sequences.

7. The display panel as claimed in claim 1, further comprising:

a gate driver configured to scan a same sub-pixel of the plurality of sub-pixels for a plurality of times in the frame to be displayed, wherein a quantity of times the same sub-pixel is scanned is equal to a quantity of times the source driver reads the plurality of pieces of bit plane data;

wherein each time the gate driver scans the sub-pixel, the source driver is enabled to load the read bit plane data to the sub-pixel; and wherein the gate driver is configured to scan the sub-pixel at least twice, to enable the source driver to respectively load the same first bit plane data read in the at least two scans to the sub-pixel twice.

8. A display panel, comprising:

a plurality of sub-pixels;

a frame buffer configured to cache a plurality of pieces of bit plane data of each of the sub-pixels corresponding to a frame to be displayed, wherein the plurality of pieces of bit plane data comprise a plurality of pieces of first bit plane data, each of the plurality of pieces of the first bit plane data is used for controlling a corresponding sub-pixel continuously to emit light or not to emit light within a duration (n1×T), n1 is an integer greater than one, different values of n1 correspond to different ones of the plurality of pieces of first bit plane data, the value of n1 is related to a storage bit of the corresponding first bit plane data, and T is a reference duration; and a source driver electrically connected between the frame buffer and the plurality of sub-pixels, and wherein the source driver is configured to read each piece of the bit plane data at least once and to read at least one piece of the first bit plane data at least twice in the corresponding frame to be displayed, wherein each time the first bit plane data is read, the first bit plane data is used for controlling the corresponding sub-pixel continuously to emit light or not to emit light within a duration T, wherein the plurality of pieces of bit plane data further comprise at least one piece of second bit plane data, each of the at least one piece of second bit plane data is used for controlling the corresponding sub-pixel continuously to emit light or not to emit light within a corresponding duration (n2×T), n2 is greater than 0 and less than or equal to 1, and different values of n2 correspond to different ones of the at least one piece of second bit plane data;

wherein the source driver is configured to control the corresponding sub-pixel continuously to emit light or not to emit light within the duration (n2×T) each time the second bit plane data is read;

wherein the plurality of pieces of first bit plane data comprise at least one piece of first type first bit plane data, the at least one piece of second bit plane data comprises at least one piece of first type second bit plane data, one of the first type first bit plane data and the first type second bit plane data is used for controlling the corresponding sub-pixel continuously to emit light within the duration (n1×T) or the duration (n2×T), and the other of the first type first bit plane data and the first type second bit plane data is used for controlling the corresponding sub-pixel continuously not to emit light within the duration (n1×T) or the duration (n2×T); and wherein the source driver is configured to read the first type second bit plane data at least once between reading of one of the at least one piece of first type first bit plane data and reading of the one of the at least one piece of first type first bit plane data the second time, or between reading of one of two different ones of the at least one piece of first type first bit plane data and reading of other of the two different ones of the at least one piece of first type first bit plane data.

9. The display panel as claimed in claim 8, wherein the plurality of pieces of first bit plane data comprise at least one piece of first type first bit plane data and at least one piece of second type first bit plane data, one of each of the at least one piece of first type first bit plane data and each of the at least one piece of second type first bit plane data is used for controlling the corresponding sub-pixel continuously to emit light within the duration (n1×T), and the other of each of the at least one piece of first type first bit plane data and each of the at least one piece of second type first bit plane data is used for controlling the corresponding sub-pixel continuously not to emit light in the duration (n1×T); and wherein the source driver is configured to read the second type first bit plane data at least once between at least two readings of a same one of the at least one piece of first type first bit plane data or between at least two readings of at least two different ones of the at least one piece of first type first bit plane data respectively.

10. The display panel as claimed in claim 9, wherein the source driver is configured to read the second type first bit plane data at least once between the at least two readings of the same one of the at least one piece of first type first bit plane data, wherein the value of n1 corresponding to the first type first bit plane data is greater than the value of n1 corresponding to the second type first bit plane data; or the source driver is configured to read the second type first bit plane data at least once between the at least two readings of the at least two different ones of the at least one piece of first type first bit plane data respectively, wherein the value of n1 corresponding to each of the at least two pieces of first type first bit plane data is greater than the value of n1 corresponding to the second type first bit plane data.

11. The display panel as claimed in claim 9, wherein the source driver is further configured to read the first type first bit plane data at least once between reading of one of the second type first bit plane data and reading of the one of the second type first bit plane data the second time or between reading of one of two different ones of the at least one piece of second type first bit plane data and reading of other of two different ones of the at least one piece of second type first bit plane data the second time.

12. The display panel as claimed in claim 8, wherein the plurality of pieces of first bit plane data in the bit plane data are arranged in sequence, in two adjacent ones of the pieces of first bit plane data, the value of n1 corresponding to one of the two adjacent pieces of first bit plane data is h times the value of n1 corresponding to the other of the two adjacent pieces of first bit plane data, and h is a positive integer greater than one.

13. The display panel as claimed in claim 8, wherein the display panel has a plurality of frames to be displayed, and in two different ones of the plurality of frames to be displayed, the source driver respectively reads the plurality of pieces of first bit plane data of the two different frames to be displayed in different sequences.

14. The display panel as claimed in claim 8, further comprising:

a gate driver configured to scan a same sub-pixel of the plurality of sub-pixels for a plurality of times in the frame to be displayed, wherein a quantity of times the same sub-pixel is scanned is equal to a quantity of times the source driver reads the plurality of pieces of bit plane data;

wherein each time the gate driver scans the sub-pixel, the source driver is enabled to load the read bit plane data to the sub-pixel; and wherein the gate driver is configured to scan the sub-pixel at least twice, to enable the source driver to respectively load the same first bit plane data read in the at least two scans to the sub-pixel twice.

15. An electronic apparatus, comprising a display panel, wherein the display panel comprises:

a plurality of sub-pixels;

a frame buffer configured to cache a plurality of pieces of bit plane data of each of the sub-pixels corresponding to a frame to be displayed, wherein the plurality of pieces of bit plane data comprise a plurality of pieces of first bit plane data, each of the plurality of pieces of the first bit plane data is used for controlling a corresponding sub-pixel continuously to emit light or not to emit light within a duration (n1×T), n1 is an integer greater than one, different values of n1 correspond to different ones of the plurality of pieces of first bit plane data, the value of n1 is related to a storage bit of the corresponding first bit plane data, and T is a reference duration; and a source driver electrically connected between the frame buffer and the plurality of sub-pixels, and wherein the source driver is configured to read each piece of the bit plane data at least once and to read at least one piece of the first bit plane data at least twice in the corresponding frame to be displayed, wherein each time the first bit plane data is read, the first bit plane data is used for controlling the corresponding sub-pixel continuously to emit light or not to emit light within a duration T, wherein the plurality of pieces of bit plane data further comprise at least one piece of second bit plane data, each of the at least one piece of second bit plane data is used for controlling the corresponding sub-pixel continuously to emit light or not to emit light within a duration (n2×T), n2 is greater than 0 and less than or equal to 1, and different values of n2 correspond to different ones of the at least one piece of second bit plane data;

wherein the source driver is configured to control the corresponding sub-pixel continuously to emit light or not to emit light within the duration (n2×T) each time the second bit plane data is read;

wherein the plurality of pieces of first bit plane data comprise at least one piece of first type first bit plane data and at least one piece of second type first bit plane data, one of each of the at least one piece of first type first bit plane data and each of the at least one piece of second type first bit plane data is used for controlling the corresponding sub-pixel continuously to emit light within the duration (n1×T), and the other of each of the at least one piece of first type first bit plane data and each of the at least one piece of second type first bit plane data is used for controlling the corresponding sub-pixel continuously not to emit light in the duration (n1×T);

wherein at least one piece of the second bit plane data comprises at least one piece of first type second bit plane data, and the first type second bit plane data and the second type first bit plane data are respectively used for controlling the corresponding sub-pixel continuously to emit light or not to emit light within the duration (n2×T) and the duration (n1×T); and wherein the source driver is configured to read the second type first bit plane data at least once between reading of the first type second bit plane data and reading of the first type first bit plane data respectively.

16. The electronic apparatus as claimed in claim 15, wherein the source driver is configured to read the second type first bit plane data at least once in a process of reading a same one of the at least one piece of first type first bit plane data at least twice or in a process of reading at least two different ones of the at least one piece of first type first bit plane data at least twice respectively.

* * * * *